United States Patent
Miller et al.

(10) Patent No.: US 8,691,733 B2
(45) Date of Patent: Apr. 8, 2014

(54) SUSPENSION CHARACTERISTICS IN INVERT EMULSIONS

(75) Inventors: Jeffrey J. Miller, Spring, TX (US);
Shadaab Syed Maghrabi, Thane (IN);
Vikrant Bhavanishankar Wagle,
Mumbai (IN); William W. Shumway,
Spring, TX (US)

(73) Assignee: Halliburton Energy Services, Inc.,
Houston, TX (US)

( * ) Notice: Subject to any disclaimer, the term of this patent is extended or adjusted under 35 U.S.C. 154(b) by 294 days.

(21) Appl. No.: 12/552,072

(22) Filed: Sep. 1, 2009

(65) Prior Publication Data

US 2011/0053808 A1     Mar. 3, 2011

(51) Int. Cl.
 *C09K 8/035*     (2006.01)
 *C09K 8/14*      (2006.01)
 *C09K 8/02*      (2006.01)
 *C09K 8/36*      (2006.01)
 *C09K 8/32*      (2006.01)

(52) U.S. Cl.
 USPC ........... 507/116; 507/100; 507/117; 507/131; 507/136; 507/138

(58) Field of Classification Search
 USPC ......... 507/100, 116, 203, 110, 117, 131, 136, 507/138; 175/65
 See application file for complete search history.

(56) References Cited

U.S. PATENT DOCUMENTS

| | | | |
|---|---|---|---|
| 2,588,808 A * | 3/1952 | Dawson | 507/126 |
| 2,661,334 A * | 12/1953 | Lummus | 507/116 |
| 2,689,219 A * | 9/1954 | Menaul | 507/116 |
| 2,996,450 A * | 8/1961 | Zech et al. | 507/110 |
| 3,125,517 A | 3/1964 | Voda | |
| 5,252,554 A | 10/1993 | Mueller et al. | |
| 5,403,822 A | 4/1995 | Mueller et al. | |
| 5,977,031 A | 11/1999 | Patel | |
| 6,620,770 B1 | 9/2003 | Kirsner et al. | |
| 6,691,805 B2 | 2/2004 | Thaemlitz | |
| 6,793,025 B2 | 9/2004 | Patel et al. | |
| 6,828,279 B2 | 12/2004 | Patel et al. | |

(Continued)

FOREIGN PATENT DOCUMENTS

| | | | |
|---|---|---|---|
| CN | 101486896 A * | 7/2009 | |
| WO | WO 97/33954 | 9/1997 | |
| WO | WO 2005/026287 A1 | 3/2005 | |
| WO | WO2011/027112 A1 | 3/2011 | |

OTHER PUBLICATIONS

The Merck Index, 2006.*
Machine translation of CN101486896A, 2009.*

(Continued)

*Primary Examiner* — Aiqun Li
(74) *Attorney, Agent, or Firm* — McDermott Will & Emery LLP; Craig W. Roddy

(57) ABSTRACT

Among the methods provided is a method of drilling a subterranean well with an invert emulsion fluid comprising: providing an invert emulsion fluid formed by combining components that comprise: an oil-based continuous phase; an aqueous discontinuous phase; and a polar hydrophobic additive that comprises a polar hydrophobe, wherein the polar hydrophobic additive may substantially increases the yield point, the low-shear yield point, or both of the invert emulsion fluid relative to a fluid without a polar hydrophobic additive while limiting the change in the plastic viscosity to no more than about 35% of the change in the property with the largest increase; and placing the invert emulsion fluid in a subterranean formation.

7 Claims, 2 Drawing Sheets

(56) References Cited

U.S. PATENT DOCUMENTS

| | | |
|---|---|---|
| 6,887,832 B2 | 5/2005 | Kirsner et al. |
| 7,008,907 B2 | 3/2006 | Kirsner et al. |
| 7,112,557 B2 | 9/2006 | Thaemlitz |
| 7,278,485 B2 | 10/2007 | Kirsner et al. |
| 7,435,706 B2 | 10/2008 | Mueller et al. |
| 7,456,135 B2 | 11/2008 | Kirsner et al. |
| 7,462,580 B2 | 12/2008 | Kirsner et al. |
| 7,485,602 B2 | 2/2009 | Kirsner et al. |
| 7,488,704 B2 | 2/2009 | Kirsner et al. |
| 7,507,694 B2 | 3/2009 | Shumway et al. |
| 7,534,743 B2 | 5/2009 | Kirsner et al. |
| 2003/0036484 A1 | 2/2003 | Kirsner et al. |
| 2003/0236172 A1 | 12/2003 | Temple et al. |
| 2004/0043905 A1 | 3/2004 | Miller et al. |
| 2004/0082483 A1 | 4/2004 | Muller et al. |
| 2005/0049147 A1 | 3/2005 | Patel et al. |
| 2005/0137093 A1 | 6/2005 | Miller |
| 2006/0111245 A1 | 5/2006 | Carbajal et al. |
| 2006/0223714 A1 | 10/2006 | Svoboda et al. |
| 2006/0223715 A1 | 10/2006 | Svoboda et al. |
| 2007/0078061 A1 | 4/2007 | Kirsner et al. |
| 2007/0082824 A1 | 4/2007 | Bell et al. |
| 2008/0015118 A1 | 1/2008 | Oyler et al. |
| 2008/0032900 A1 | 2/2008 | Kirsner et al. |

OTHER PUBLICATIONS

International Search Report and Written Opinion for PCT/GB2010/001656 dated Nov. 15, 2010.

Burrows et al., *Benchmark Performance: Zero Barite Sag and Significantly Reduced Downhole Losses with the Industry's First Clay-Free Synthetic-Based Fluid*, Society of Petroleum Engineers, IADC/SPE 87138, Mar. 2-4, 2004.

Product Information Sheet for ACCOLADE®, available from Halliburton Energy Services, Inc., 2005.

Product Data Sheet for ADAPTA™, available from Halliburton Energy Services, Inc., Sep. 5, 2006.

Product Data Sheet for ATC®, available from Halliburton Energy Services, Inc., Sep. 5, 2006.

Product Data Sheet for BARACARB®, available from Halliburton Energy Services, Inc., Sep. 5, 2006.

Product Data Sheet for BAROID® 41, available from Halliburton Energy Services, Inc., Nov. 28, 2006.

Product Data Sheet for BAROID ALKANE™, available from Halliburton Energy Services, Inc., Sep. 5, 2006.

Product Data Sheet for COLDTROL®, available from Halliburton Energy Services, Inc., Sep. 5, 2006.

Product Data Sheet for EZ MUL®, available from Halliburton Energy Services, Inc., Sep. 5, 2006.

Product Information Sheet for FACTANT™ Concentrated Emulsifier, available from Halliburton Energy Services, Inc., Aug. 2005.

Product Data Sheet for LE SUPERMUL™, available from Halliburton Energy Services, Inc., Jan. 19, 2007.

Product Data Sheet for OMC® 2, available from Halliburton Energy Services, Inc., Sep. 5, 2006.

Product Data Sheet for RHEMOD™ L, available from Halliburton Energy Services, Inc., Sep. 5, 2006.

Product Data Sheet for TAU-MOD™, available from Halliburton Energy Services, Inc., Oct. 23, 2007.

Product Data Sheet for TEMPERUS™, available from Halliburton Energy Services, Inc., Sep. 5, 2006.

\* cited by examiner

SUSPENSION CHARACTERISTICS IN INVERT EMULSIONS

BACKGROUND

This invention is generally related to methods and compositions for treating well bores in subterranean formations, and more particularly to oil-based drilling fluids and additives suitable for such fluids to improve their suspension characteristics.

A drilling fluid, or "mud" which a drilling fluid is also often called, is a specially designed fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

Specific drilling fluid systems are selected to optimize a drilling operation in accordance with the characteristics of a particular geological formation. A drilling fluid typically comprises water and/or oil, synthetic oil, or other synthetic material or fluid as a base fluid, with solids in suspension. A non-aqueous based drilling fluid typically contains oil or a synthetic fluid as a continuous phase and may also contain water dispersed in the continuous phase by emulsification so that there is no distinct layer of water in the fluid. Such dispersed water in oil is generally referred to as an invert emulsion or water-in-oil emulsion. A number of additives may be included in such oil based drilling fluids and invert emulsions to improve certain properties of the fluid. Such additives may include, for example, emulsifiers, weighting agents, fluid-loss additives or fluid-loss control agents, viscosifiers or viscosity control agents, and alkali.

An essential criterion for assessing the utility of a fluid as a drilling fluid or as a well service fluid may include the fluid's rheological parameters, particularly under simulated drilling and well bore conditions. For use as a drilling fluid, or as a fluid for servicing a well, a fluid generally should be capable of maintaining certain viscosities suitable for drilling and circulation in the well bore. Preferably, a drilling fluid will be sufficiently viscous to be capable of supporting and carrying the well drill cuttings to the surface without being so viscous as to interfere with the drilling operation. Moreover, a drilling fluid must be sufficiently viscous to be able to suspend barite and other weighting agents. However, increased viscosity can result in problematic sticking of the drill string, and increased circulating pressures can contribute to lost circulation problems.

Commonly, additives are included in the drilling fluid to increase the viscosity or carrying capacity of the fluid. These additives may include solids, including fine or colloidal solids, that may add density to the weight of the fluid while at the same time increasing its viscosity. However, the addition of solids may be detrimental as a fluid may exhibit better rheological properties in a clean state. Faster drilling rates may also be achieved by employing low-solids or solids-free fluids in some cases. When porous hydrocarbon-producing formations are drilled, the size and composition of suspended solids may be regulated to provide optimal bridging and minimize invasion. Calcium carbonate may be used in these situations as it may generally be acid-soluble, and thus provides a removable filter cake. Other clay-based solids commonly used in drilling fluids may be less desirable since they do not provide the same advantage.

Organophilic clays may commonly be used as the viscosity-building agent in oil-based muds. These generally comprise amine-treated bentonite or hectorite clay, which may typically require vigorous agitation in the fluid to reach a fully active state and provide an increase in viscosity. Time pressures may demand that fluids be prepared quickly for shipment to the drilling operation. As a result, inadequate shear and over-treatment may occur when using organophilic clays.

In addition, small particles of solid matter may ultimately be too small to be effectively removed from the system by surface processing equipment during and after completion of the well bore. As a result, fluids which do not contain organophilic clays may offer advantages in several aspects of drilling.

SUMMARY

This invention is generally related to methods and compositions for treating well bores in subterranean formations, and more particularly to oil-based drilling fluids and additives to improve their suspension characteristics.

An embodiment comprises a method of drilling a subterranean well with an invert emulsion fluid comprising: providing an invert emulsion fluid formed by combining components that comprise: an oil-based continuous phase; an aqueous discontinuous phase; and a polar hydrophobic additive that comprises a polar hydrophobe, wherein the polar hydrophobic additive substantially increases the yield point, the low-shear yield point, or both of the invert emulsion fluid relative to a fluid without a polar hydrophobic additive while limiting the change in the plastic viscosity to no more than about 35% of the change in the property with the largest increase; and placing the invert emulsion fluid in a subterranean formation.

Another embodiment comprises a method comprising: providing an invert emulsion fluid comprises: an oil-based continuous phase; an aqueous discontinuous phase; and a polar hydrophobic additive that comprises a polar hydrophobe, wherein the polar hydrophobic additive comprises a compound with a structure selected from the group consisting of:

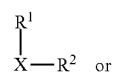

(Formula 1)

or

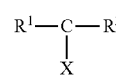

(Formula 2)

wherein R1 and R2 comprise at least partially hydrophobic groups, X comprises a hydrophilic group, and C is a carbon atom, wherein the polar hydrophobic additive may substantially increase the yield point, the low-shear yield point, or both of the invert emulsion fluid relative to a fluid without a polar hydrophobic additive while limiting the change in the plastic viscosity to no more than about 35% of the change in the property with the largest increase; and placing the invert emulsion fluid in a subterranean formation.

Yet another embodiment comprises an invert emulsion fluid comprises: an oil-based continuous phase; an aqueous discontinuous phase; and a polar hydrophobic additive comprising a polar hydrophobe, wherein the polar hydrophobic additive may substantially increase the yield point, the low-shear yield point, or both of the invert emulsion fluid relative to a fluid without a polar hydrophobic additive while limiting the change in the plastic viscosity to no more than about 35% of the change in the property with the largest increase.

Another embodiment comprises a method of preparing an invert emulsion fluid comprising: providing a base oil; providing an aqueous fluid; providing a polar hydrophobic additive, and combining the base oil, the aqueous fluid, and the polar hydrophobic additive to form an invert emulsion fluid, wherein the base oil comprises a continuous phase and the aqueous fluid comprises a discontinuous phase of the invert emulsion fluid, wherein the polar hydrophobic additive may substantially increase the yield point, the low-shear yield point, or both of the invert emulsion fluid relative to a fluid without a polar hydrophobic additive while limiting the change in the plastic viscosity to no more than about 35% of the change in the property with the largest increase.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
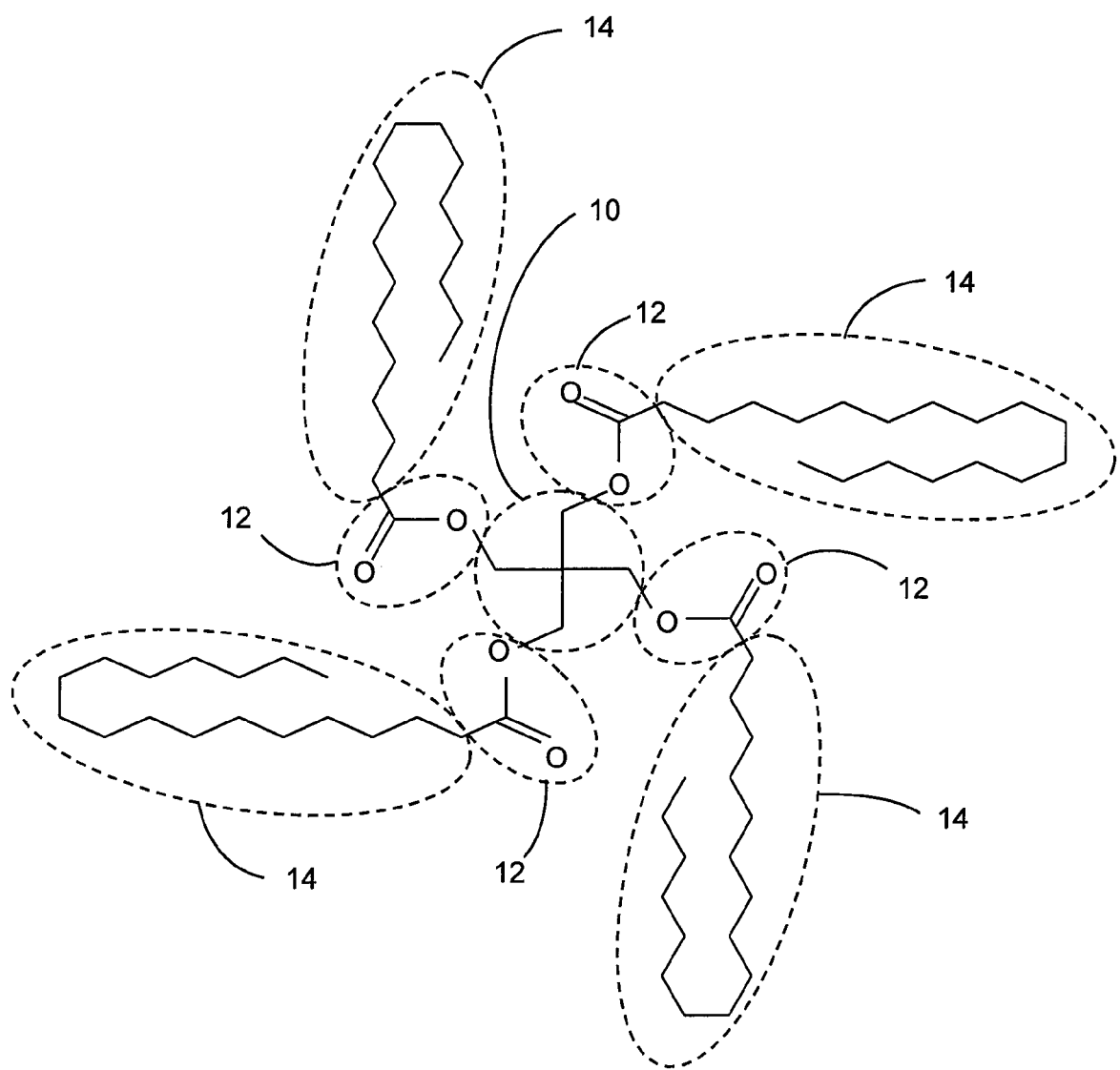
FIG. 1 illustrates an embodiment of a polar hydrophobe.

This invention is generally related to methods and compositions for treating well bores in subterranean formations, and more particularly to oil-based drilling fluids and additives to improve their suspension characteristics.

While the methods and fluids of the present invention have many advantages, only some will be discussed herein. One advantage of the present invention may include the ability to create and use a low density fluid that exhibits acceptable fluid properties when used in a well, for example, as a drilling or workover fluid. Maintaining good low-shear viscosity and yield point may be considered important characteristics for cleaning cuttings from the well bore and aiding in suspension of barite or other weighting materials. In an embodiment, a fluid of the present invention may have an adequate low-shear yield point and a viscosity capable of transporting drill cuttings without the need for solid additives, such as weighting agents or organophilic clays.

In particular, the polar hydrophobic additives disclosed herein may be used to produce a treatment fluid with an increased yield point ("YP") and low-shear viscosity without substantially increasing the plastic viscosity ("PV"). Further, the polar hydrophobic additives disclosed herein may be used in relatively small amounts to achieve the desirable rheological properties. The polar hydrophobic additives may also be used as viscosifiers and may exhibit temperature stabilization and improved lubrication characteristics. The polar hydrophobic additives may also be applied when a relatively high-viscosity volume of fluid is needed for various purposes, such as for a treatment fluid.

As used herein, the term "treatment fluid" refers generally to any fluid that may be used in a subterranean application in conjunction with a desired function and/or for a desired purpose. The term "treatment fluid" does not imply any particular action by the fluid or any component thereof. Examples of treatment fluids may include: drilling fluids, drill-in fluids, spacer fluids between different fluid types (cement and drilling fluid, for example), viscous packer fluids for suspending well operations, high-viscosity sweep fluids to aid in cuttings transport, and other various tasks requiring viscous fluids.

In some embodiments, the present invention applies to fluids and methods of influencing the rheology of treatment fluids comprising invert (water-in-oil) emulsions. Among the methods provided is a method of drilling a subterranean well with an invert emulsion fluid comprising: providing an invert emulsion fluid, wherein the invert emulsion fluid has been formed by combining at least the following components: an oil-based continuous phase; an aqueous discontinuous phase; and a polar hydrophobic additive that comprises a polar hydrophobe, wherein the polar hydrophobic additive may substantially increases the yield point, the low-shear yield point, or both of the invert emulsion fluid relative to a fluid without a polar hydrophobic additive while limiting the change in the plastic viscosity to no more than about 35% of the change in the property with the largest increase; and placing the invert emulsion fluid in a subterranean formation.

In some embodiments, the treatment fluids of the present invention may comprise an invert emulsion fluid that has been formed by combining at least the following components: an oil-based continuous phase; an aqueous discontinuous phase; and a polar hydrophobic additive that comprises a polar hydrophobe. The polar hydrophobic additive may be included in the invert emulsion in such quantities as are desired in order to obtain the appropriate fluid properties for a treatment operation, such as a specific well being drilled. Other common additives may be combined with the emulsion for various reasons, such as weighting agents or fluid loss control agents.

The oil-based continuous phase may comprise a base oil, which may or may not be combined with additional oils or miscible components. Suitable base oils include, but are not limited to, diesel oils, paraffinic oils, mineral oils, synthetic oils, or other such hydrocarbons, and combinations of these fluids. Paraffins or paraffinic oils useful in fluids comprising invert emulsion may be linear, branched, poly-branched, cyclic, or isoparaffins, preferably having about 10 to about 30 carbon atoms.

In an embodiment, a synthetic base oil may comprise ester oils, glycerides of fatty acids, aliphatic esters, aliphatic ethers, aliphatic acetal, or other such hydrocarbons and combinations of these fluids. Examples of ester oils for blending may be those comprising about $C_6$ to about $C_{14}$ fatty acids and alcohols. Another ester oil that may be used as a base oil comprised of about $C_{12}$ to about $C_{14}$ fatty acids and 2-ethyl hexanol or about $C_8$ fatty acids and 2-ethyl hexanol. This ester oil is available commercially under tradenames PETROFREE® and PETROFREE LV™, respectively, from Halliburton Energy Services, Inc. in Houston, Tex.

Isomerized, or internal, olefins for blending with the esters for an ester blend may be any such olefins, straight chain, branched, or cyclic, preferably having about 10 to about 30 carbon atoms. Isomerized, or internal, olefins having about 40 to about 70 weight percent $C_{16}$ and about 20 to about 50 weight percent $C_{18}$ are especially preferred. An example of an isomerized olefin for use in an ester blend in the invention that is commercially available is PETROFREE SF™ Base fluid, available from Halliburton Energy Services, Inc. in Houston, Tex. Alternatively, other hydrocarbons such as paraffins, mineral oils, or combinations thereof may be substituted for or added to the olefins in the ester blend. Such other hydrocarbons may comprise from about 1 weight percent to about 99 weight percent of such blend. In addition to those base oils listed above, a combination of the ester oil comprised of about $C_{12}$ to about $C_{14}$ fatty acids and 2-ethyl hexanol or about $C_8$ fatty acids and 2-ethyl hexanol with the isomerized olefin in an ester blend may also be used as a base oil. This blend is commercially available as ACCOLADE™ available from Halliburton Energy Services, Inc. in Houston, Tex.

Other examples of suitable invert emulsion base oils include isomerized olefins blended with other hydrocarbons such as linear alpha olefins, paraffins, or naphthenes, or combinations thereof ("hydrocarbon blends"). When blended with esters or other hydrocarbons such as isomerized olefins, linear alpha olefins, or naphthenes in the invention, the paraffins should comprise at least about 1 weight percent to about 99 weight percent of the blend, but preferably less than about 50 weight percent. Naphthenes or naphthenic hydrocarbons for use in blends comprising invert emulsions may be any saturated, cycloparaffinic compound, composition or material with a general chemical formula of $C_nH_{2n}$ where n is a number about 5 to about 30.

The amount of base oil in the invert emulsion fluid may vary depending upon the particular base oil used, the particular aqueous fluid used, any additives included in the invert emulsion fluid, and the particular application in which the invert emulsion fluid is to be employed. However, generally the amount of base oil must be sufficient to form a stable emulsion when utilized as the continuous phase. In an embodiment, the amount of base oil is at least about 30, at least about 40, or alternatively at least about 50 percent by volume of the total fluid.

The aqueous-based discontinuous phase may comprise any aqueous fluid that is at least partly immiscible with the base oil. In an embodiment, the immiscible liquid phase may be an aqueous fluid. Typical aqueous fluids include, but are not limited to, substances such as fresh water, sea water, brine containing inorganic or organic dissolved salt compounds, mixtures containing water-miscible organic compounds (e.g., an alcohol, a glycerol, a glycol, etc.), and mixtures of these. In one embodiment the aqueous fluid is a brine solution including inorganic salts such as calcium halide salts, sodium halide salts, alkali metal halide salts and the like.

The amount of the aqueous fluid in the invert emulsion fluid may vary depending upon the particular aqueous fluid used and the particular application in which the invert emulsion fluid is to be employed. In an embodiment, the amount of aqueous fluid in the invert emulsion fluid should not be so great that it cannot be dispersed in the base oil phase. Therefore, the aqueous fluid may comprise about 1% to about 90% by volume of the total invert emulsion fluid. In another embodiment, the aqueous fluid may comprise about 30% to about 50% of the total volume of the invert emulsion fluid.

The polar hydrophobic additives disclosed herein may be used to create an invert emulsion fluid with improved suspension characteristics suitable for use in a subterranean treatment operation. As used herein, "improved suspension characteristics" may refer to changes in the rheological properties of a fluid so that it may demonstrate improved suspension characteristics for weighting agents and drill cuttings, thus improving the ability of the fluid to transport drill cuttings through the annulus to the surface. In an embodiment, the improved suspension characteristics may be characterized by rheological property changes including maintaining a good low-shear viscosity and YP, while keeping the PV as low as possible. However, no specific fluid rheological threshold values are intended to be implied by the term improved suspension characteristics. A low plastic viscosity may help minimize the amount of density increase, or equivalent circulating density, caused by pumping the fluid. The rheological properties useful in describing the present invention include, but are not limited to, yield point ("YP"), low-shear viscosity, plastic viscosity ("PV"), the equivalent circulating density ("ECD"), and yield stress (tau zero). The YP is defined as the value obtained from the Bingham-Plastic rheological model when extrapolated to a shear rate of zero. It may be calculated using 300 revolutions per minute ("rpm") and 600 rpm shear rate readings on a standard oilfield rheometer. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. A more convenient means of estimating the yield stress is by calculating the low-shear yield point ("LSYP") by the same formula shown below in Equation 2 though with the 6 rpm and 3 rpm readings substituted for the 600- and 300-rpm readings, respectively. PV represents the viscosity of a fluid when extrapolated to infinite shear rate. A low PV may indicate that a fluid is capable of drilling rapidly because, among other things, the low viscosity of fluid exiting the drill bit and the ability to use an increased flow rate. A high PV may be caused by a viscous base fluid, excess colloidal solids, or both. The PV and YP are calculated by the following set of equations:

$$PV = (600\text{rpm reading}) - (300\text{rpm reading}) \quad \text{(Equation 1)}$$

$$YP = (300\text{rpm reading}) - PV \quad \text{(Equation 2)}$$

The ECD is the effective circulating density exerted by a fluid against the formation taking into account the flow rate and pressure drop in the annulus above the point being considered. A high PV may increase the ECD due to a greater pressure drop in the annulus caused by internal fluid friction.

The rheological properties useful in describing the present invention may be measured using standard testing procedures and standard testing equipment known to those skilled in the art. For example, properties such as plastic viscosity expressed in centipoises, low-shear viscosity expressed in dial readings, yield point and LSYP expressed in lb/100 ft$^2$, and gel strength expressed in lb/100 ft$^2$ may be determined by the "ANSI/API RP 13B-2: Recommended Practice for Field Testing Oil-based Drilling Fluids," using a 115-volt motor-driven viscometer, such as a FANN Model 35-A V-G Meter, which is incorporated herein by reference in its entirety. The rotational measurements represent standard rates at which readings may be taken. Actual rotational rates may vary slightly and may be corrected using correction factors, if necessary.

The polar hydrophobic additives of the present invention may be added to an invert emulsion fluid to improve the suspension characteristics of the fluid. In describing the properties, it may be convenient to designate a reference temperature of 120° F., as outlined in the API specifications. In an embodiment, an invert emulsion fluid with a polar hydrophobic additive may have a yield point at 120° F. between about 7 and about 40 lb/100 ft$^2$. In another embodiment, an invert emulsion fluid with a polar hydrophobic additive of the present invention may have a yield point between about 18 and about 35 lb/100 ft$^2$. The invert emulsion fluid with a polar hydrophobic additive may have a low-shear viscosity of greater than or equal to about 6 when measured at 6 rpm and 120° F., and/or greater than or equal to about 5 when measured at 3 rpm. The low-shear yield point may be greater than or equal to about 4 lb/100 ft$^2$. In another embodiment, the low-shear yield point may be greater than or equal to about 7 lb/100 ft². The invert emulsion fluid with a polar hydrophobic additive of the present invention may have a PV of about 60 centipoise or less. In another embodiment, the PV value of the invert emulsion fluid with a polar hydrophobic additive may be about 40 centipoise or less, depending on the proportions of solid particles and aqueous phase present in the fluid. While these properties may be influenced by temperature and pressure, the YP, low-shear dial readings and yield stress may be expected to remain substantially consistent over a range covering most typical treatment fluid operations.

In an embodiment, the polar hydrophobic additives may be used to change the rheological properties of an invert emulsion fluid. In an embodiment, the polar hydrophobic additive may substantially increase the yield point, the low-shear yield point, or both without similarly increasing the plastic viscosity. For example, the polar hydrophobic additive may substantially increase the yield point, the low-shear yield point, or both of the invert emulsion fluid relative to an invert emulsion fluid without a polar hydrophobic additive while limiting the change in the plastic viscosity to no more than about 35% of the change in the property with the largest increase. For example, if the addition of a polar hydrophobic additive increases the yield point of an invert emulsion fluid by 40% and the low-shear yield point by 90% relative to an invert emulsion fluid without a polar hydrophobic additive, then the increase in the plastic viscosity may be less than about 31.5% (i.e., 35% of the change in the property with the largest increase, which is the 90% increase in the low-shear yield point). In another embodiment, the polar hydrophobic additive may substantially increase the yield point, the low-shear yield point, or both of the invert emulsion fluid relative to an invert emulsion fluid without a polar hydrophobic additive while limiting the change in the plastic viscosity to no more than about 40% of the change in the property with the largest increase. In an embodiment, a substantial increase in the yield point or the low-shear yield point may be measured by an increase of about 25% of the property or more. In another embodiment, a substantial increase in the yield point or the low-shear yield point may be measured by an increase of about 40% of the property or more.

In an embodiment, a polar hydrophobic additive may comprise any number of compounds having a general formula represented by:

(Formula 1)

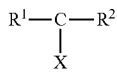

(Formula 2)

where $R^1$ and $R^2$ represent at least partially hydrophobic groups, X represents a hydrophilic group, and, in Formula 2, C represents a carbon atom. Such compounds may be at least partially oil-soluble due to the presences of $R^1$ and $R^2$, and may have about ten to about five hundred carbon atoms. In an embodiment, multiple groups may also be possible. For example, there may be a plurality of X groups all bonded to a central $R^1$, and may further include one or more $R^2$ groups bonded to one or more of the X groups.

In an embodiment, $R^1$ may comprise any aliphatic hydrocarbon with one or more carbon atoms, any aromatic hydrocarbon, or compound formed from a combination of an aliphatic and aromatic hydrocarbon. In an embodiment, $R^2$ may comprise any aliphatic hydrocarbon with four or more carbon atoms, any aromatic hydrocarbon, or compound formed from a combination of an aliphatic and aromatic hydrocarbon.

In an embodiment, X may comprise any compound or functional group that may be at least partially hydrophilic. In an embodiment, X may comprise a halogen, an haloformyl group, a hydroxyl group, an aromatic group, a carbonyl group, an aldehyde group, a carbonate group, a carboxylate group, a carboxyl group, an ether group, a hydroperoxy group, a peroxy group, a carboxamide group, an amine group, a cyanate group, a nitrate group, a nitrile group, a phosphate group, a phosphonate group, a sulfonyl group, a sulfonate group, a sulfate group, or any combination thereof.

In some embodiments, X may comprise an ester group. In these embodiments, there may be four or more ester groups, represented by X in Formula 1 and Formula 2 above. These ester groups may be bonded to $R^1$ and may have one or more $R^2$ groups bonded to each ester group. Examples of polar hydrophobic additives useful in the polar hydrophobic additives of the present invention may include, but are not limited to, pentaerythritol tetrastearate (PE-TS), trimethylol propane trioleate (TMP), pentaerythritol tetraoleate (PE-TO), neopentyl glycol oleate, a combination thereof, or a derivative thereof. An embodiment of a polar hydrophobe comprising PE-TS is shown in FIG. 1. As may be seen from the figure, PE-TS has a partially hydrophobic group 10 ($R^1$), bonded to hydrophilic groups 12 (X) with hydrophobic groups 14 ($R^2$). In another embodiment, the polar hydrophobic additives may include polyol esters, sucrose-based polyol esters, sorbitan esters, glycerol-type esters, glycol esters, and any combination thereof. In another embodiment, a polar hydrophobic additive may comprise a fatty alcohol ester. In an embodiment, a fatty alcohol ester may be any compound with a fatty acid component and a fatty alcohol component, and may have, for example, more than eight carbon atoms. For example, a ceto-stearate ester, a cetyl palmitate, a cetostearyl stearate, a stearyl stearate, or a combination thereof may be used as a polar hydrophobic additive.

In still another embodiment, a polar hydrophobic additive may include a fatty acid of an epoxide or polycarbonate, and fatty acid polymers of epoxides and polycarbonates with five or fewer repeating units.

Figure 2:
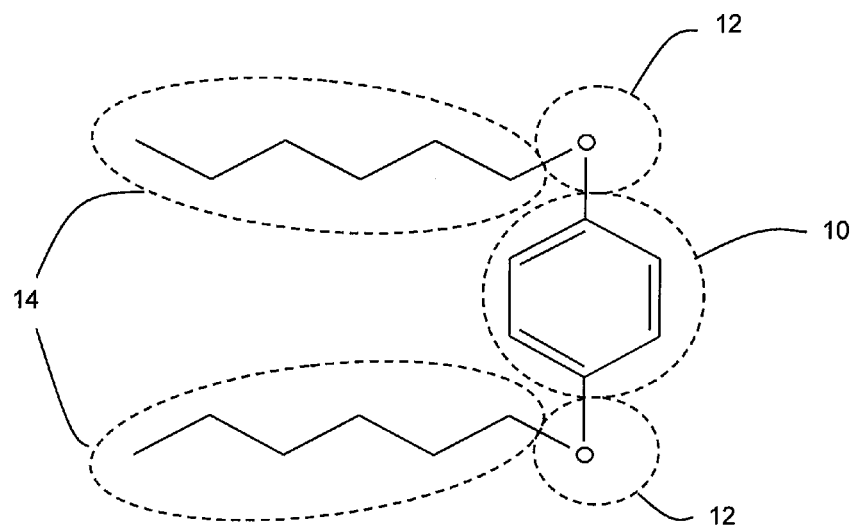
FIG. 2 illustrates another embodiment of a polar hydrophobe.
Figure 3:
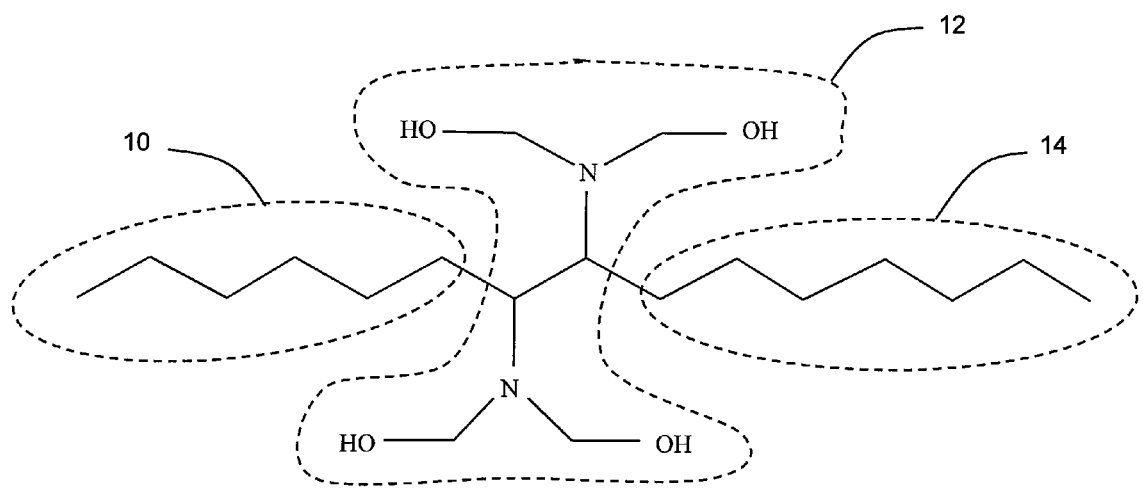
FIG. 3 illustrates still another embodiment of a polar hydrophobe.

Still other embodiments are shown in FIGS. 2 and 3. FIG. 2 depicts a polar hydrophobe with a benzene ring acting as the partially hydrophobic group 10 (R1) bonded to an ether group that acts as an at least partially hydrophilic group 12 (X), which is further bonded to a hexane tail that acts a hydrophobic group 14 (R2). FIG. 3 depicts still another embodiment comprising a hexane group acting as an at least partially hydrophobic group 10 (R1) bonded to a N,N-tetramethoxy ethylene diamine acting as an at least partially hydrophilic group 12 (X), which is further bonded to a heptane group acting as a hydrophobic group 14 (R2).

The amount of polar hydrophobic additive present in an invert emulsion fluid of the present invention may vary depending on several factors, including, but not limited to, the particular base oil used, the particular aqueous fluid used, any additives included in the invert emulsion fluid, and the particular application in which the invert emulsion fluid is to be employed. One of ordinary skill in the art with the benefit of this disclosure will be able to determine an appropriate amount. For example, the polar hydrophobic additive may demonstrate a greater effect with an olefin base oil than a paraffin base oil, requiring a lower amount of the polar hydrophobic additive to achieve a similar set of improvements in the suspension characteristics. Generally, the amount of the polar hydrophobic additive may be sufficient to achieve the desired rheological properties. As a general trend, when the number of functional groups increases, the less of the polar hydrophobic additive (e.g., an ester or a polyol ester) is required to achieve the same rheological properties. In addition, the density and oil water ratio of the invert emulsion fluid has an effect on the amount of the polar hydrophobic additive necessary to achieve the desired properties. In general, as the density and the water content of the invert emulsion fluid increases, the less of the polar hydrophobic additive is needed to improve the suspension characteristics. In an embodiment, the polar hydrophobic additive may be added in an amount of between about 0.25 to about 18 pounds per barrel of invert emulsion fluid ("lbs/bbl"). In another embodiment, the polar hydrophobic additive may be added in an amount of between about 3 to about 12 lbs/bbl.

The invert emulsion fluids of the present invention may optionally contain a variety of additives. Examples of additives useful in the invert emulsion fluid may include, but are not limited to, solids, weighting agents, inert solids, fluid loss control agents, emulsifiers, salts, dispersion aids, corrosion inhibitors, emulsion thinners, emulsion thickeners, viscosifiers, and any combination thereof. In an embodiment, an invert emulsion fluid of the present invention may not have added to it any organophilic clays. The invert emulsion fluid of the present invention does not need organophilic clay or organophilic lignites to provide it needed viscosity, suspension characteristics, or filtration control. While not being limited by theory, the lack of organophilic clays and organophilic lignites in the fluid is believed to enhance the tolerance of the fluid to other solids, such as drill cuttings. Fluids that do not contain organophilic clays, organophilic lignites, or both are believed to provide more consistent rheological properties over wide operational temperature ranges, and more fragile yield stresses or gel strengths. In an embodiment, some amount of organophilic clay may be tolerated in the invert emulsion fluid. In an embodiment, the invert emulsion fluid may contain less than 1 lb/bbl, less than 2 lb/bbl, or alternatively less than 3 lbs/bbl organophilic clay before the rheological properties begin to change.

In an embodiment, the solids content, including the amount of weighting agents, drill solids, and any other solids in the fluid (e.g., hydrated lime) may be less than about 600 lb/bbl, or alternatively less than about 200 lb/bbl. Such solids, or weighting agents, which serve to increase the density of the invert emulsion fluids, may be any solids known to those skilled in the art as useful for such purpose. Examples of weighting agents may include, but are not limited to, barite, calcite, ilmenite, mullite, gallena, manganese oxides, iron oxides, mixtures of these and the like. For example, a ground barium sulfate additive having the tradename BAROID® available from Halliburton Energy Services, Inc. in Houston, Tex., U.S.A. may be used as a weighting agent. The weighting material may typically be added in order to alter the density of the invert emulsion fluid. The density of the fluid may be less than about 20, or less than about 15, or alternatively less than about 10 pounds per gallon. One skilled in the art would be able to determine the amount of weighting agent to add to produce an invert emulsion fluid with a desired density.

In an embodiment, the invert emulsion fluid may comprise fluid-loss control additives, emulsifiers, or both. Fluid loss control agents such as modified lignite, polymers, oxidized asphalt and gilsonite may also be added to the invert emulsion fluid. Usually such fluid loss control agents are employed in an amount which is at least about 0.1, at least about 1, or at least about 5 percent by weight of the total fluid. For example, an additive having the trade name ADAPTA™ available from Halliburton Energy Services, Inc. in Houston, Tex., U.S.A. may be used as a fluid loss control additive. Alkali may also be used, preferably lime (calcium hydroxide or calcium oxide), to bind or react with acidic gases (e.g., $CO_2$ and $H_2S$) encountered during drilling in the formation. The quantity of free lime in a drilling fluid may range from about 1 to about 10 lbs/bbl, or more preferably about 1 to about 4 lbs/bbl, although lower ranges such as less than about 2 lbs/bbl are preferred for certain esters that tend to hydrolyze in the presence of alkaline compounds as will be known to those skilled in the art. Other suitable agents as an alternative to lime may also be used to adjust and/or stabilize invert emulsion fluids with respect to acids.

Various supplemental surfactants and wetting agents conventionally used in invert emulsion fluids may optionally be incorporated in the fluids of this invention. Such surfactants are, for example, fatty acids, soaps of fatty acids, amido amines, polyamides, polyamines, imidazoline derivatives, oxidized crude tall oil, organic phosphate esters, alkyl aromatic sulfates and sulfonates, as well as, mixtures of the above. Generally, such surfactants are employed in an amount which does not interfere with the use of the fluids of this invention. For example, the surfactants or wetting agents may be used in an amount that does not interfere with the ability of an invert emulsion fluid to act as a drilling fluid and remove cuttings from the well bore.

Further, the invert emulsion fluid may have added to it or mixed with the invert emulsion base, other fluids or materials. Such materials may include for example additives to reduce or control temperature rheology or to provide thinning, such as, for example, additives having the tradenames COLD-TROL®, RHEMOD™ L, ATC®, and OMC 2™; additives for providing temporary increased viscosity for shipping (transport to the well site) and for use in sweeps, such as, for example an additive having the tradename TEMPERUS™ (modified fatty acid); additives for bridging porous rock, such as, for example additives having the tradename BARA-CARB® 50; additives for high temperature high pressure filtration control (HTHP FILTRATE) and emulsion stability, such as, for example, additives having the tradename FAC-TANT™ (highly concentrated tall oil derivative); and additives for emulsification, such as, for example additives having the tradenames EZ MUL™ NT or LE SUPERMUL™ (polyaminated fatty acids). Blends of thinners such as the OMC 2™, COLDTROL®, and ATC® may also be effective in fluids of the invention. All of the aforementioned trademarked products are available from Halliburton Energy Services, Inc. in Houston, Tex., U.S.A.

Viscosifying agents other than organophilic clays may optionally be employed in the invert emulsion fluids of the present invention. Usually, viscosifying agents such as oil soluble polymers, polyamide resins, polycarboxylic acids and fatty acid soaps may be employed. The amount of viscosifying agent used in the composition will necessarily vary depending upon the end use of the composition. Usually such viscosifying agents are employed in an amount which is at least about 0.1, at least about 2, or at least about 5 percent by weight of the total fluid. For example, TAU-MOD™ available from Halliburton Energy Services, Inc. in Houston, Tex., U.S.A. may be used as a viscosifying agent. Alternatively, the polar hydrophobic additives of the present invention may be used as the primary viscosifying agent.

Still further, dispersion aids, corrosion inhibitors and/or defoamers may be used. These and other suitable auxiliaries and additives are used in amounts known to those skilled in the art depending on the conditions of the particular well bore and subterranean formation.

Generally, the invert emulsion fluids of the present invention may be formed using any technique known in the art. For example, the components may be mixed together in any order under agitation condition. A representative method of preparing the invert emulsion fluids comprises mixing an appropriate quantity of base oil and an appropriate quantity of the polar hydrophobic additive and any optional additives during continuous, mild agitation. An aqueous fluid is then added while mixing until an invert emulsion is formed. If weight material, such as those described above, are to be added, then the weight material is typically added after the invert emulsion fluid is formed. Alternatively, the invert emulsion fluids of the present invention may be prepared by simply adding the polar hydrophobic additive to an existing stock of drilling fluid. The effectiveness of this treatment may depend on the constituents of the fluid.

The invert emulsion fluid may be used for any of a number of purposes known in the art. In general, the invert emulsion fluid may be used in any application that requires a viscous fluid capable of suspending a solid. For example, the invert emulsion fluid may be used as a drilling fluid. In a typical drilling operation, the invert emulsion fluid would be pumped through a drill string until it passed through a drill bit at the end of the drill string. The invert emulsion fluid may power the drill bit using a hydraulic motor while simultaneously lubricating the bit during operation. The invert emulsion fluid may then be returned to the surface through the annular space between the drill string and the bore hole wall. The invert emulsion fluid may be used to suspend the drill cuttings and return them to the surface. At the surface, the drill cuttings may be substantially separated from the invert emulsion fluid; whereupon the invert emulsion fluid is recycled downhole through the drill string to repeat the process.

An embodiment comprises a composition for use as an invert emulsion fluid. The composition comprises a base oil, an aqueous fluid, and a polar hydrophobic additive.

Another embodiment comprises a method for preparing a composition for use as an invert emulsion fluid. The method comprises providing a base oil, providing an aqueous fluid, and providing a polar hydrophobic additive. The method also comprises combining the base oil, the aqueous fluid, and the polar hydrophobic additive to form an invert emulsion fluid.

Yet another embodiment comprises a method of using the invert emulsion fluid in a completion, workover, or gravel packing operation. In another embodiment, the invert emulsion fluid may be used for drilling a subterranean well. The method comprises providing an invert emulsion fluid, wherein the invert emulsion fluid has a base oil, an aqueous fluid, and a polar hydrophobic additive. The method also comprises drilling a well using the invert emulsion fluid.

To facilitate a better understanding of the present invention, the following representative examples of certain aspects of some embodiments are given. In no way should the following examples be read to limit, or define, the scope of the invention.

EXAMPLES

The following examples are submitted for the purpose of demonstrating the performance characteristics of the invert emulsion fluids of the present invention. These tests were conducted substantially in accordance with the test methods described in ANSI/API RP 13B-2: Recommended Practice for Field Testing Oil-based Drilling Fluids unless stated otherwise. The following abbreviations may be used in describing the results of the experimentation.

"E.S." is electrical stability of the emulsion as measured by the test described in Composition and Properties of Drilling and Completion Fluids, 5th Edition, H. C. H. Darley, George R. Gray, Gulf Publishing Company, 1988, pp. 116, the contents of which are hereby incorporated by reference. Generally, the higher the number, the more stable the emulsion.

"PV" is plastic viscosity as described above, which is one variable used in the calculation of viscosity characteristics of an invert emulsion fluid and is measured in units of centipoise (cp).

"YP" is yield point as described above, which is another variable used in the calculation of viscosity characteristics of invert emulsion fluids, measured in pounds per 100 square feet (lb/100 ft$^2$).

"TAU Zero" is the yield stress, which is the stress that must be applied to a material to make it begin to flow (or yield), and is commonly reported in pounds per 100 square feet (lb/100 ft$^2$).

"LSYP" is the low-shear yield point, measured in pounds per 100 square feet (lb/100 ft$^2$).

"GELS" is a measure of the suspending characteristics, or the thixotropic properties of an invert emulsion fluid for a given period of time, measured in pounds per 100 square feet (lb/100 ft$^2$).

"HTHP filtrate" is the term used for high temperature high pressure fluid loss at 250° F., measured in milliliters (ml).

As used in the formulation of the invert emulsion fluids illustrated in the following examples the following component names are intended to mean the following:

Escaid™ 110 is a cyclic paraffin base oil distributed by Exxon of Houston, Tex.

BAROID ALKANE™ is linear paraffin base oil distributed by Halliburton Energy Services, Inc. of Houston, Tex.

EDC 99-DW is a mineral base oil distributed by Total of France.

ADAPTA® is a filtration control agent distributed by Halliburton Energy Services, Inc. of Houston, Tex.

EZ MUL™ NT is an emulsification agent distributed by Halliburton Energy Services, Inc. of Houston, Tex.

BAROID® comprises barium sulfate as a weighting agent and is distributed by Halliburton Energy Services, Inc. in Houston, Tex.

TAU-MOD™ is a viscosifying agent distributed by Halliburton Energy Services, Inc. in Houston, Tex.

BARACARB® is a sized marble bridging agent distributed by Halliburton Energy Services, Inc. in Houston, Tex.

Rev Dust is an artificial drill solid distributed by Milwhite, Inc. of Houston, Tex.

RHEMOD™ L is a viscosifying agent distributed by Halliburton Energy Services, Inc. in Houston, Tex. While RHEMOD™ L may affect the rheological properties of a fluid to which it is added, RHEMOD™ L should not be considered a polar hydrophobic additive of the present invention.

LE SUPERMUL™ is a polyaminated fatty acid that can be used to emulsify water distributed by Halliburton Energy Services, Inc. in Houston, Tex.

Sodium bentonite clay is distributed by a number of suppliers including Halliburton Energy Services, Inc. in Houston, Tex.

OMC® 42 oil-based mud conditioner is a thinner/dispersant distributed by Halliburton Energy Services, Inc. in Houston, Tex.

Example 1

Four invert emulsions having a density of about 9.0 pounds per gallon ("ppg") and an oil to water ratio ("OWR") of about 60:40 were formulated as indicated below in Table 1. The first formulation comprises base oil without any of the polar hydrophobic additives of the present invention. The next three formulations contain increasing amounts of pentaerythritol tetrastearate ("PE-TS"), a polar hydrophobe, in pounds per barrel (ppb) to demonstrate the effects of the polar hydrophobic additives of the present invention.

TABLE 1

Formulations of 9 ppg Invert Emulsion Fluids Using PE-TS

| Formulation | Time to mix (min) | 1 (Base Mud) | 2 (3 ppb PE-TS) | 3 (6 ppb PE-TS) | 4 (9 ppb PE-TS) |
|---|---|---|---|---|---|
| OWR | | 60:40 | 60:40 | 60:40 | 60:40 |
| ESCAID 110 (bbl) | | 0.51 | 0.50 | 0.49 | 0.48 |
| EZ MUL NT (ppb) | 2 | 8.00 | 8.00 | 8.00 | 8.00 |
| Lime (ppb) | 2 | 3.00 | 3.00 | 3.00 | 3.00 |
| RHEMOD ™ L (ppb) | 2 | 3.00 | 3.00 | 3.00 | 3.00 |
| ADAPTA (ppb) | 5 | 1.50 | 1.50 | 1.50 | 1.50 |
| PE-TS (ppb) | 5 | — | 3.00 | 6.00 | 9.00 |
| $CaCl_2$ soln, ppb (200K WPS) | 2 | 161.07 | 161.07 | 161.07 | 161.07 |
| TAU-MOD (ppb) | 5 | 5.00 | 5.00 | 5.00 | 5.00 |
| Rev Dust (ppb) | 5 | 20.00 | 20.00 | 20.00 | 20.00 |
| BAROID (ppb) | 10 | 28.65 | 28.65 | 28.65 | 28.65 |
| BARACARB 5 (ppb) | 10 | 5.00 | 5.00 | 5.00 | 5.00 |

Samples of the above invert emulsion fluid formulations were hot rolled at 250° F. for 16 hours. The rheological properties of the resulting fluids are given below in Table 2.

TABLE 2

Rheological Properties of 9 ppg Invert Emulsion Fluids Using PE-TS

| Formulation | | 1 (Base Mud) | 2 (3 ppb PE-TS) | 3 (6 ppb PE-TS) | 4 (9 ppb PE-TS) |
|---|---|---|---|---|---|
| Fann 35 Readings | | | | | |
| 600 rpm | 120° F. | 36 | 67 | 78 | 84 |
| 300 rpm | 120° F. | 20 | 43 | 50 | 57 |
| 200 rpm | 120° F. | 15 | 33 | 40 | 46 |
| 100 rpm | 120° F. | 10 | 22 | 28 | 33 |
| 6 rpm | 120° F. | 2 | 7 | 10 | 13 |
| 3 rpm | 120° F. | 2 | 6 | 8 | 11 |
| Properties | | | | | |
| PV | 120° F. | 16 | 24 | 28 | 27 |
| YP | 120° F. | 4 | 19 | 22 | 30 |
| LSYP | 120° F. | 2 | 5 | 6 | 9 |
| GELS 10 sec | 120° F. | 2 | 7 | 9 | 11 |
| GELS 10 min | 120° F. | 3 | 9 | 10 | 13 |
| ES @ 120° F., mV | 120° F. | 136 | 148 | 162 | 148 |
| HTHP FILTRATE, ml/30 min (250° F.) | | 1.0 | 0.8 | 0.8 | 0.4 |

Upon review of the above data, one of ordinary skill in the art should understand that the invert emulsion fluids formulated in accordance with the present invention demonstrate improved rheological properties. In particular, the invert emulsion fluids formulated according to the present invention demonstrate improved suspension characteristics, including good low-shear viscosity and YP, while maintaining the PV as low as possible. The results show that the PV value was only increased by about 50% to about 75% while the low-shear viscosity as measured by LSYP was increased by about 150% to about 350% and the YP was increased by about 375% to about 650%.

Example 2

Four invert emulsions having a density of about 8.5 pounds per gallon ("ppg") and an oil to water ratio ("OWR") of about 60:40 were formulated as indicated below in Table 3. The first formulation comprises a base oil without any of the polar hydrophobic additives of the present invention. The next three formulations contain increasing amount of pentaerythritol tetrastearate ("PE-TS"), a polar hydrophobe, to demonstrate the effects of the polar hydrophobic additives of the present invention.

TABLE 3

Formulations of 8.5 ppg Invert Emulsion Fluids Using PE-TS

| Formulation | Time (min) | 5 (Base Mud) | 6 (3 ppb PE-TS) | 7 (6 ppb PE-TS) | 8 (9 ppb PE-TS) |
|---|---|---|---|---|---|
| OWR | | 60:40 | 60:40 | 60:40 | 60:40 |
| ESCAID 110 (bbl) | | 0.53 (146.72 g) | 0.52 (143.72 g) | 0.51 (140.72 g) | 0.50 (137.72 g) |
| EZ MUL NT (ppb) | 2 | 7.00 | 7.00 | 7.00 | 7.00 |
| Lime (ppb) | 2 | 3.00 | 3.00 | 3.00 | 3.00 |
| RHEMOD ™ L (ppb) | 2 | 3.00 | 3.00 | 3.00 | 3.00 |
| ADAPTA (ppb) | 5 | 1.50 | 1.50 | 1.50 | 1.50 |
| PE-TS (ppb) | 5 | — | 3.00 | 6.00 | 9.00 |
| CaCl$_2$ soln, ppb (200K WPS) | 2 | 164.37 | 164.37 | 164.37 | 164.37 |
| TAU-MOD (ppb) | 5 | 5.00 | 5.00 | 5.00 | 5.00 |
| Rev Dust (ppb) | 5 | 20.00 | 20.00 | 20.00 | 20.00 |
| BARACARB 5 (ppb) | 10 | 5.00 | 5.00 | 5.00 | 5.00 |

Samples of the above invert emulsion fluid formulations were hot rolled at 250° F. for 16 hours. The rheological properties of the resulting fluids are given below in Table 4.

TABLE 4

Rheological Properties of 8.5 ppg Invert Emulsion Fluids Using PE-TS

| Formulation | | 5 (Base Mud) | 6 (3 ppb PE-TS) | 7 (6 ppb PE-TS) | 8 (9 ppb PE-TS) |
|---|---|---|---|---|---|
| Fann 35 Readings | | | | | |
| 600 rpm | 120° F. | 27 | 32 | 36 | 47 |
| 300 rpm | 120° F. | 15 | 19 | 23 | 32 |
| 200 rpm | 120° F. | 11 | 15 | 18 | 27 |
| 100 rpm | 120° F. | 8 | 10 | 13 | 19 |
| 6 rpm | 120° F. | 3 | 3 | 4 | 8 |
| 3 rpm | 120° F. | 2 | 2 | 3 | 7 |
| Properties | | | | | |
| PV | 120° F. | 12 | 13 | 13 | 15 |
| YP | 120° F. | 3 | 6 | 10 | 17 |
| LSYP | 120° F. | 1 | 1 | 2 | 6 |
| GELS 10 sec | 120° F. | 3 | 3 | 5 | 7 |
| GELS 10 min | 120° F. | 4 | 4 | 6 | 8 |
| ES @ 120° F., mV | 120° F. | 81 | 112 | 105 | 107 |
| HTHP FILTRATE, ml/30 min (250° F.) | | 1.0 | 1.2 | 0.8 | 1.2 |

Upon review of the above data, one of ordinary skill in the art should understand that the invert emulsion fluids formulated in accordance with the present invention demonstrate improved rheological properties. In particular, the invert emulsion fluids formulated according to the present invention demonstrate improved suspension characteristics, including good low-shear viscosity and YP, while maintaining the PV as low as possible. The results show that the effect on the PV value ranged from increasing the PV value by 8.3% with 3 ppb of PE-TS to increasing the PV value by 25% with 9 ppb of PE-TS. At the same time the low-shear viscosity as measured by LSYP was increased by about 0% to about 500% and the YP was increased by about 100% to about 467%, depending on the amount of PE-TS added.

Example 3

Four invert emulsions having a density of about 9.0 pounds per gallon ("ppg") and an oil to water ratio ("OWR") of about 60:40 were formulated as indicated below in Table 5. The first formulation comprised linear paraffin base oil (Baroid Alkane™ available from Halliburton Energy Services, Inc. of Houston, Tex.) without any of the polar hydrophobic additives of the present invention. The next three formulations contained the same base components with various polar hydrophobes including pentaerythritol tetrastearate ("PE-TS"), trimethylol propane trioleate (TMP), and pentaerythritol tetraoleate (PE-TO), respectively. The formulations demonstrate the effects of the polar hydrophobic additives of the present invention in a linear paraffin base oil.

TABLE 5

Formulations of 9 ppg Invert Emulsion Fluids Using Linear Paraffin Base Oil

| Formulation | Time (min) | 12 (Base Mud) | 13 (9 ppb PE-TS) | 14 (9 ppb TMP) | 15 (9 ppb PE-TO) |
|---|---|---|---|---|---|
| OWR | | 60:40 | 60:40 | 60:40 | 60:40 |
| Baroid Alkane (bbl) | | 0.51 | 0.48 | 0.48 | 0.48 |
| EZ MUL NT (ppb) | 2 | 8.00 | 8.00 | 8.00 | 8.00 |
| RHEMOD ™ L (ppb) | 2 | 3.00 | 3.00 | 3.00 | 3.00 |
| Lime (ppb) | 2 | 3.00 | 3.00 | 3.00 | 3.00 |

TABLE 5-continued

Formulations of 9 ppg Invert Emulsion
Fluids Using Linear Paraffin Base Oil

| Formulation | Time (min) | 12 (Base Mud) | 13 (9 ppb PE-TS) | 14 (9 ppb TMP) | 15 (9 ppb PE-TO) |
|---|---|---|---|---|---|
| ADAPTA (ppb) | 5 | 1.50 | 1.50 | 1.50 | 1.50 |
| PE-TS (ppb) | 5 | — | 9.00 | — | — |
| TMP (ppb) | 5 | — | — | 9.00 | — |
| PE-TO (ppb) | 5 | — | — | — | 9.00 |
| CaCl₂ soln, ppb (200K WPS) | 2 | 160.26 | 160.26 | 160.26 | 160.26 |
| TAU-MOD (ppb) | 5 | 5.00 | 5.00 | 5.00 | 5.00 |
| Rev Dust (ppb) | 5 | 20.00 | 20.00 | 20.00 | 20.00 |
| BAROID (ppb) | 10 | 35.61 | 35.61 | 35.61 | 35.61 |
| BARACARB 5 (ppb) | 10 | 5.00 | 5.00 | 5.00 | 5.00 |

Samples of the above invert emulsion fluid formulations were hot rolled at 250° F. for 16 hours. The rheological properties of the resulting fluids are given below in Table 6.

TABLE 6

Rheological Properties of 9 ppg Invert Emulsion
Fluids Using Linear Paraffin Base Oil

| Formulation | | 12 (Base Mud) | 13 (9 ppb PE-TS) | 14 (9 ppb TMP) | 15 (9 ppb PE-TO) |
|---|---|---|---|---|---|
| Fann 35 Readings | | | | | |
| 600 rpm | 120° F. | 41 | 65 | 66 | 67 |
| 300 rpm | 120° F. | 25 | 45 | 47 | 46 |
| 200 rpm | 120° F. | 19 | 37 | 39 | 38 |
| 100 rpm | 120° F. | 13 | 27 | 29 | 29 |
| 6 rpm | 120° F. | 5 | 12 | 13 | 13 |
| 3 rpm | 120° F. | 4 | 10 | 11 | 12 |
| Properties | | | | | |
| PV | 120° F. | 16 | 20 | 19 | 21 |
| YP | 120° F. | 9 | 25 | 28 | 25 |
| LSYP | 120° F. | 3 | 8 | 9 | 11 |
| GELS 10 sec | 120° F. | 5 | 10 | 11 | 12 |
| GELS 10 min | 120° F. | 7 | 12 | 14 | 14 |
| ES @ 120° F., mV | | 130 | 144 | 150 | 145 |
| HTHP FILTRATE, ml/30 min (250° F.) | | 2.4 | 0.4 | 2.0 | 2.2 |

Upon review of the above data, one of ordinary skill in the art should understand that the invert emulsion fluids formulated in accordance with the present invention demonstrate improved rheological properties using linear paraffin base oil. In particular, the invert emulsion fluids formulated according to the present invention demonstrate improved suspension characteristics including good low-shear viscosity and YP, while at the same time keeping the PV as low as possible. The results show that the PV value was affected by only increasing about 25% to about 31% above the base mud. At the same time the low-shear viscosity as measured by LSYP was increased by an amount ranging from about 67% to about 267% and the YP was increased by an amount ranging from about 178% to about 211%.

Example 4

Four invert emulsions having a density of about 9.0 pounds per gallon ("ppg") and an oil to water ratio ("OWR") of about 60:40 were formulated as indicated below in Table 7. The first formulation comprised cyclic alkane base oil (Escaid 110™ available from Exxon of Houston, Tex.) without any of the polar hydrophobic additives of the present invention. The next three formulations contained the same base components with various polar hydrophobes including pentaerythritol tetrastearate ("PE-TS"), trimethylol propane trioleate (TMP), and pentaerythritol tetraoleate (PE-TO), respectively. The formulations demonstrate the effects of the polar hydrophobic additives of the present invention in a cyclic alkane base oil.

TABLE 7

Formulations of 9 ppg Invert Emulsion
Fluids Using Cyclic Alkane Base Oil

| Formulation | Time (min) | 16 (Base Mud) | 17 (9 ppb PE-TS) | 18 (9 ppb TMP) | 19 (9 ppb PE-TO) |
|---|---|---|---|---|---|
| OWR | | 60:40 | 60:40 | 60:40 | 60:40 |
| Escaid 110 (bbl) | | 0.51 | 0.48 | 0.48 | 0.48 |
| EZ MUL NT (ppb) | 2 | 8.00 | 8.00 | 8.00 | 8.00 |
| Lime (ppb) | 2 | 3.00 | 3.00 | 3.00 | 3.00 |
| RHEMOD ™ L (ppb) | 2 | 3.00 | 3.00 | 3.00 | 3.00 |
| ADAPTA (ppb) | 5 | 1.50 | 1.50 | 1.50 | 1.50 |
| PE-TS (ppb) | 5 | — | 9.00 | — | — |
| TMP (ppb) | 5 | — | — | 9.00 | — |
| PE-TO (ppb) | 5 | — | — | — | 9.00 |
| CaCl₂ soln, ppb (200K WPS) | 2 | 161.07 | 161.07 | 161.07 | 161.07 |
| TAU-MOD (ppb) | 5 | 5.00 | 5.00 | 5.00 | 5.00 |
| Rev Dust (ppb) | 5 | 20.00 | 20.00 | 20.00 | 20.00 |
| BAROID (ppb) | 10 | 28.65 | 28.65 | 28.65 | 28.65 |
| BARACARB 5 (ppb) | 10 | 5.00 | 5.00 | 5.00 | 5.00 |

Samples of the above invert emulsion fluid formulations were hot rolled at 250° F. for 16 hours. The rheological properties of the resulting fluids are given below in Table 8.

TABLE 8

Rheological Properties of 9 ppg Invert Emulsion
Fluids Using Cyclic Alkane Base Oil

| Formulation | | 16 (Base Mud) | 17 (9 ppb PE-TS) | 18 (9 ppb TMP) | 19 (9 ppb PE-TO) |
|---|---|---|---|---|---|
| Fann 35 Readings | | | | | |
| 600 rpm | 120° F. | 36 | 84 | 78 | 75 |
| 300 rpm | 120° F. | 20 | 57 | 54 | 52 |
| 200 rpm | 120° F. | 15 | 46 | 44 | 42 |
| 100 rpm | 120° F. | 10 | 33 | 32 | 31 |
| 6 rpm | 120° F. | 2 | 13 | 12 | 12 |
| 3 rpm | 120° F. | 2 | 11 | 10 | 10 |
| Properties | | | | | |
| PV | 120° F. | 16 | 27 | 24 | 23 |
| YP | 120° F. | 4 | 30 | 30 | 29 |
| LSYP | 120° F. | 2 | 9 | 8 | 8 |
| GELS 10 sec | 120° F. | 2 | 11 | 11 | 11 |
| GELS 10 min | 120° F. | 3 | 13 | 14 | 14 |
| ES @ 120° F., mV | | 136 | 148 | 147 | 147 |
| HTHP FILTRATE, ml/30 min (250° F.) | | 1.0 | 0.4 | 1.2 | 0.4 |

Upon review of the above data, one of ordinary skill in the art should understand that the invert emulsion fluids formulated in accordance with the present invention demonstrate improved rheological properties using cyclic alkane base oil. In particular, the invert emulsion fluids formulated according to the present invention demonstrate improved suspension characteristics including good low-shear viscosity and YP, while at the same time keeping the PV as low as possible. The results show that the PV value was affected by increasing by about 44% to about 69% above the base mud. At the same time the low-shear viscosity as measured by LSYP was increased by about 300% to about 350% and the YP was increased by an amount ranging from about 625% to about 650%.

Example 5

Four invert emulsions having a density of about 9.0 pounds per gallon ("ppg") and an oil to water ratio ("OWR") of about 60:40 were formulated as indicated below in Table 9. The first formulation comprised mineral base oil (EDC 99-DW available from TOTAL of France) without any of the polar hydrophobic additives of the present invention. The next three formulations contained the same base components with various polar hydrophobes including pentaerythritol tetrastearate ("PE-TS"), trimethylol propane trioleate (TMP), and pentaerythritol tetraoleate (PE-TO), respectively. The formulations demonstrate the effects of the polar hydrophobic additives of the present invention in a mineral base oil.

TABLE 9

Formulations of 9 ppg Invert Emulsion Fluids Using Mineral Base Oil

| Formulation | Time (min) | 20 (Base Mud) | 21 (9 ppb PE-TS) | 22 (9 ppb TMP) | 23 (9 ppb PE-TO) |
|---|---|---|---|---|---|
| OWR | | 60:40 | 60:40 | 60:40 | 60:40 |
| EDC 99-DW (bbl) | | 0.517 | 0.485 | 0.485 | 0.485 |
| EZ MUL NT (ppb) | 2 | 8.00 | 8.00 | 8.00 | 8.00 |
| Lime (ppb) | 2 | 3.00 | 3.00 | 3.00 | 3.00 |
| RHEMOD ™ L (ppb) | 2 | 3.00 | 3.00 | 3.00 | 3.00 |
| ADAPTA (ppb) | 5 | 1.50 | 1.50 | 1.50 | 1.50 |
| PE-TS (ppb) | 5 | — | 9.00 | — | — |
| TMP (ppb) | 5 | — | — | 9.00 | — |
| PE-TO (ppb) | 5 | — | — | — | 9.00 |
| CaCl$_2$ soln, ppb (200K WPS) | 2 | 161.64 | 161.64 | 161.64 | 161.64 |
| TAU-MOD (ppb) | 5 | 5.00 | 5.00 | 5.00 | 5.00 |
| Rev Dust (ppb) | 5 | 20.00 | 20.00 | 20.00 | 20.00 |
| BAROID (ppb) | 10 | 23.99 | 23.99 | 23.99 | 23.99 |
| BARACARB 5 (ppb) | 10 | 5.00 | 5.00 | 5.00 | 5.00 |

Samples of the above invert emulsion fluid formulations were hot rolled at 250° F. for 16 hours. The rheological properties of the resulting fluids are given below in Table 10.

TABLE 10

Rheological Properties of 9 ppg Invert Emulsion Fluids Using Mineral Base Oil

| Formulation | | 20 (Base Mud) | 21 (9 ppb PE-TS) | 22 (9 ppb TMP) | 23 (9 ppb PE-TO) |
|---|---|---|---|---|---|
| Fann 35 Readings | | | | | |
| 600 rpm | 120° F. | 61 | 71 | 69 | 71 |
| 300 rpm | 120° F. | 36 | 46 | 47 | 48 |
| 200 rpm | 120° F. | 27 | 37 | 39 | 40 |
| 100 rpm | 120° F. | 18 | 27 | 28 | 29 |
| 6 rpm | 120° F. | 6 | 11 | 11 | 12 |
| 3 rpm | 120° F. | 5 | 10 | 10 | 11 |
| Properties | | | | | |
| PV | 120° F. | 25 | 25 | 22 | 23 |
| YP | 120° F. | 11 | 21 | 25 | 25 |
| LSYP | 120° F. | 4 | 9 | 9 | 10 |
| GELS 10 sec | 120° F. | 7 | 10 | 10 | 11 |
| GELS 10 min | 120° F. | 9 | 12 | 12 | 13 |
| ES @ 120° F., mV | | 142 | 123 | 143 | 144 |
| HTHP FILTRATE, ml/30 min (250° F.) | | 1.0 | 1.0 | 1.0 | 1.0 |

Upon review of the above data, one of ordinary skill in the art should understand that the invert emulsion fluids formulated in accordance with the present invention demonstrate improved rheological properties using mineral base oil. In particular, the invert emulsion fluids formulated according to the present invention demonstrate improved suspension characteristics including good low-shear viscosity and YP, while at the same time keeping the PV as low as possible. The results show that the PV value was affected by remaining the same or decreasing by about 12%. At the same time the low-shear viscosity as measured by LSYP was increased by about 125% to about 150% and the YP was increased by about 91% to about 127%.

Example 6

Four invert emulsions having a density of about 9.0 pounds per gallon ("ppg") and an oil to water ratio ("OWR") of about 60:40 were formulated as indicated below in Table 11. The formulations were intended to demonstrate the improved suspension characteristics that could be obtained in the absence of low density solids. The first formulation comprised a cyclic alkane base oil without any of the polar hydrophobic additives of the present invention and was called the Base Mud formulation. The next three formulations contained pentaerythritol tetrastearate ("PE-TS"), a polar hydrophobe, and did not contain various low density solids used in the Base Mud case.

TABLE 11

Formulations of 9 ppg Invert Emulsion Fluids With Varying Low Density Solids Concentrations

| Formulation | Time (min) | 24 (Base Mud) | 25 | 26 | 27 |
|---|---|---|---|---|---|
| OWR | | 60:40 | 60:40 | 60:40 | 60:40 |
| Escaid 110 (bbl) | | 0.51 | 0.48 | 0.49 | 0.49 |
| EZ MUL NT (ppb) | 2 | 8.00 | 8.00 | 8.00 | 8.00 |
| Lime (ppb) | 2 | 3.00 | 3.00 | 3.00 | 3.00 |
| RHEMOD ™ L (ppb) | 2 | 3.00 | 3.00 | 3.00 | — |
| ADAPTA (ppb) | 5 | 1.50 | 1.50 | 1.50 | 1.50 |
| PE-TS (ppb) | 5 | — | 9.00 | 9.00 | 9.00 |
| CaCl$_2$ soln, ppb (200K WPS) | 2 | 161.07 | 161.07 | 162.32 | 161.00 |
| TAU-MOD (ppb) | 5 | 5.00 | 5.00 | — | 5.00 |
| Rev Dust (ppb) | 5 | 20.00 | 20.00 | 20.00 | 20.00 |
| BAROID (ppb) | 10 | 28.65 | 28.65 | 36.16 | 29.30 |
| BARACARB 5 (ppb) | 10 | 5.00 | 5.00 | — | 5.00 |

Samples of the above invert emulsion fluid formulations were hot rolled at 250° F. for 16 hours. The rheological properties of the resulting fluids are given below in Table 12.

TABLE 12

Rheological Properties of 9 ppg Invert Emulsion Fluids
Using With Varying Low Density Solids Concentrations

| Formulation | | 24 (Base Mud) | 25 | 26 | 27 |
|---|---|---|---|---|---|
| Fann 35 Readings | | | | | |
| 600 rpm | 120° F. | 36 | 84 | 74 | 52 |
| 300 rpm | 120° F. | 20 | 57 | 52 | 34 |
| 200 rpm | 120° F. | 15 | 46 | 42 | 27 |
| 100 rpm | 120° F. | 10 | 33 | 30 | 19 |
| 6 rpm | 120° F. | 2 | 13 | 12 | 7 |
| 3 rpm | 120° F. | 2 | 11 | 10 | 6 |
| Properties | | | | | |
| PV | 120° F. | 16 | 27 | 22 | 18 |
| YP | 120° F. | 4 | 30 | 30 | 16 |
| LSYP | 120° F. | 2 | 9 | 8 | 5 |
| GELS 10 sec | 120° F. | 2 | 11 | 10 | 6 |
| GELS 10 min | 120° F. | 3 | 13 | 11 | 7 |
| ES @ 120° F., mV | | 136 | 148 | 140 | 165 |
| HTHP FILTRATE, ml/30 min (250° F.) | | 1.0 | 0.4 | 1.0 | 1.0 |

Upon review of the above data, one of ordinary skill in the art should understand that the invert emulsion fluids formulated in accordance with the present invention demonstrate improved rheological properties without low density solids. In particular, the invert emulsion fluids formulated according to the present invention demonstrate improved suspension characteristics including good low-shear viscosity and YP, while at the same time keeping the PV as low as possible. As shown by Formulation 26, the polar hydrophobic additives of the present invention can impart improved suspension characteristics even in the absence of a viscosifying agent (e.g., TAU-MOD™) and a fine grind bridging agent (e.g., BARA-CARB® 5). Formulation 27 shows improved suspension characteristics relative to the base mud even without a primary viscosifying agent (e.g., RHEMOD™ L)

Example 7

The polar hydrophobic additives of the present invention may be used as primary viscosifiers in an invert emulsion fluid. In order to demonstrate the ability of the polar hydrophobic additives of the present invention to act as primary viscosifiers, four invert emulsion fluid formulations were prepared that contained varying amounts of a viscosifying agent (RHEMOD™ L) with no polar hydrophobic additives. Another four invert emulsion fluids were then prepared without a viscosifying agent and containing varying amounts of a polar hydrophobic additive of the present invention. All of the invert emulsion formulations had a density of about 9.0 pounds per gallon ("ppg") and an oil to water ratio ("OWR") of about 60:40. All formulations used a cyclic alkane as the base oil. The first four formulations without polar hydrophobic additives of the present invention were formulated as indicated below in Table 13. The next four formulations with polar hydrophobic additives and without a separate viscosifying agent were formulated as indicated below in Table 14. The four formulations containing the polar hydrophobic additives used pentaerythritol tetrastearate ("PE-TS") as the polar hydrophobic additive.

TABLE 13

Formulations of 9 ppg Invert Emulsion
Fluids Using A Viscosifying Agent

| Formulations Containing RHEMOD™ L | Time (min) | 28 (0 ppb) | 29 (1.5 ppb) | 30 (3 ppb) | 31 (5 ppb) |
|---|---|---|---|---|---|
| OWR | | 60:40 | 60:40 | 60:40 | 60:40 |
| Escaid 110 (bbl) | | 0.52 | 0.52 | 0.51 | 0.51 |
| EZ MUL NT (ppb) | 2 | 8.00 | 8.00 | 8.00 | 8.00 |
| Lime (ppb) | 2 | 3.00 | 3.00 | 3.00 | 3.00 |
| RHEMOD™ L (ppb) | 2 | 0.00 | 1.50 | 3.00 | 5.00 |
| ADAPTA (ppb) | 5 | 1.50 | 1.50 | 1.50 | 1.50 |
| PE-TS (ppb) | | — | — | — | — |
| CaCl₂ soln, ppb (200K WPS) | 2 | 160.99 | 161.03 | 161.07 | 161.07 |
| TAU-MOD (ppb) | 5 | 5.00 | 5.00 | 5.00 | 5.00 |
| Rev Dust (ppb) | 5 | 20.00 | 20.00 | 20.00 | 20.00 |
| BAROID (ppb) | 10 | 29.30 | 28.93 | 28.65 | 28.20 |
| BARACARB 5 (ppb) | 10 | 5.00 | 5.00 | 5.00 | 5.00 |

TABLE 14

Formulations of 9 ppg Invert Emulsion Fluids
With A Polar Hydrophobic Additive

| Formulation Containing PE-TS | Time (min) | 32 (3 ppb) | 33 (6 ppb) | 34 (9 ppb) | 35 (12 ppb) |
|---|---|---|---|---|---|
| OWR | | 60:40 | 60:40 | 60:40 | 60:40 |
| Escaid 110 (bbl) | | 0.49 | 0.49 | 0.49 | 0.49 |
| EZ MUL NT (ppb) | 2 | 8.00 | 8.00 | 8.00 | 8.00 |
| Lime (ppb) | 2 | 3.00 | 3.00 | 3.00 | 3.00 |
| RHEMOD™ L (ppb) | 2 | — | — | — | — |
| ADAPTA (ppb) | 5 | 1.50 | 1.50 | 1.50 | 1.50 |
| PE-TS (ppb) | 5 | 3.00 | 6.00 | 9.00 | 12.00 |
| CaCl₂ soln, ppb (200K WPS) | 2 | 160.99 | 160.99 | 160.99 | 160.99 |
| TAU-MOD (ppb) | 5 | 5.00 | 5.00 | 5.00 | 5.00 |
| Rev Dust (ppb) | 5 | 20.00 | 20.00 | 20.00 | 20.00 |
| BAROID (ppb) | 10 | 29.30 | 29.30 | 29.30 | 29.30 |
| BARACARB 5 (ppb) | 10 | 5.00 | 5.00 | 5.00 | 5.00 |

All of the samples of the above invert emulsion fluid formulations were hot rolled at 250° F. for 16 hours. The rheological properties of the resulting fluids are given below in Tables 15 and 16.

TABLE 15

Rheological Properties of Invert Emulsion
Fluids With A Viscosifier

| Formulations Containing RHEMOD™ L | | 28 (0 ppb) | 29 (1.5 ppb) | 30 (3 ppb) | 31 (5 ppb) |
|---|---|---|---|---|---|
| Fann 35 Readings | | | | | |
| 600 rpm | 120° F. | 25 | 45 | 36 | 36 |
| 300 rpm | 120° F. | 14 | 25 | 20 | 20 |
| 200 rpm | 120° F. | 10 | 19 | 15 | 14 |
| 100 rpm | 120° F. | 6 | 12 | 10 | 8 |
| 6 rpm | 120° F. | 2 | 3 | 2 | 2 |
| 3 rpm | 120° F. | 1 | 2 | 2 | 2 |
| Properties | | | | | |
| PV | 120° F. | 11 | 20 | 16 | 16 |
| YP | 120° F. | 3 | 5 | 4 | 4 |
| LSYP | 120° F. | 0 | 1 | 2 | 2 |
| GELS 10 sec | 120° F. | 2 | 3 | 2 | 2 |

TABLE 15-continued

Rheological Properties of Invert Emulsion
Fluids With A Viscosifier

| Formulations Containing RHEMOD ™ L | | 28 (0 ppb) | 29 (1.5 ppb) | 30 (3 ppb) | 31 (5 ppb) |
|---|---|---|---|---|---|
| GELS 10 min | 120° F. | 3 | 5 | 3 | 3 |
| ES @ 120° F., mV | | 138 | 152 | 136 | 147 |
| HTHP FILTRATE, ml/30 min (250° F.) | | 1.0 | 1.2 | 1.0 | 1.0 |

TABLE 16

Rheological Properties of Invert Emulsion
Fluids With A Polar Hydrophobic Additive

| Formulation Containing PE-TS | | 32 (3 ppb) | 33 (6 ppb) | 34 (9 ppb) | 35 (12 ppb) |
|---|---|---|---|---|---|
| Fann 35 Readings | | | | | |
| 600 rpm | 120° F. | 25 | 41 | 44 | 52 |
| 300 rpm | 120° F. | 14 | 24 | 27 | 34 |
| 200 rpm | 120° F. | 10 | 17 | 21 | 27 |
| 100 rpm | 120° F. | 6 | 12 | 15 | 19 |
| 6 rpm | 120° F. | 2 | 4 | 5 | 7 |
| 3 rpm | 120° F. | 1 | 3 | 4 | 6 |
| Properties | | | | | |
| PV | 120° F. | 11 | 17 | 17 | 18 |
| YP | 120° F. | 3 | 7 | 10 | 16 |
| LSYP | 120° F. | 0 | 2 | 3 | 5 |
| GELS 10 sec | 120° F. | 2 | 3 | 5 | 6 |
| GELS 10 min | 120° F. | 3 | 4 | 5 | 7 |
| ES @ 120° F., mV | | 138 | 155 | 170 | 165 |

Upon review of the above data, one of ordinary skill in the art should understand that the invert emulsion fluids formulated in accordance with the present invention demonstrate improved rheological properties even without an added viscosifier. The results demonstrate that the amount of polar hydrophobic additive added to the invert emulsion fluid of the present invention may be used as a primary viscosifier without the need for addition viscosifying agents being added to the formulation. In particular, the invert emulsion fluids formulated according to the present invention demonstrate improved suspension characteristics relative to a low-density fluid containing a viscosifier without a polar hydrophobic additive of the present invention.

Further studies involving the fluid formulation identified as number 33, containing 6 lb/bbl PE-TS, were conducted to gauge the impact of added inert solids, alkaline solids and saline water. These were introduced to the fluid samples which were then hot rolled at 250° F. for 4 hours. Inert solid additions such as 122 lb/bbl barite or 40 lb/bbl Rev Dust had little effect on the rheological properties. Similarly, an addition of 10% by volume seawater did not cause a drastic change in the properties. However, very high viscosity was noted with addition of 5 lb/bbl lime, though this condition was found to be controllable. On treatment with 0.8 lb/bbl OMC 42 thinner/dispersant, the sample resumed its original properties before the lime addition.

Example 8

The polar hydrophobic additives of the present invention may be used as viscosifiers in an invert emulsion fluid. In order to demonstrate the ability of the polar hydrophobic additives of the present invention to act as primary viscosifiers, four invert emulsion fluid formulations were prepared that contained varying amounts of a viscosifying agent (TAU-MOD™) with polar hydrophobic additives of the present invention. Two of the invert emulsion formulations had a density of about 9.0 pounds per gallon ("ppg") while the other two invert emulsion formulations had a density of 13.0 ppg. The salinity of the aqueous phase was 200,000 ppm in the 9 ppg mud and was 250,000 ppm for the 13 ppg mud. All formulations used a linear paraffin base oil (BAROID ALKANE™). In addition to the formulations listed above, a base invert emulsion formula was prepared for comparison. The five invert emulsion fluids were formulated as indicated below in Table 17. The formulations containing the polar hydrophobic additives used pentaerythritol tetrastearate ("PE-TS") as the polar hydrophobic additive.

TABLE 17

Formulations of Invert Emulsion Fluids With
and Without a Separate Viscosifying Agent

| Formulations Containing RHEMOD ™ L | 36 (Base Mud) | 37 | 38 | 39 | 40 | 41 |
|---|---|---|---|---|---|---|
| Density, lb/gal | 9 | 9 | 9 | 13 | 13 | 13 |
| BAROID ALKANE, bbl | 0.51 | 0.48 | 0.48 | 0.48 | 0.46 | 0.45 |
| EZ MUL NT, ppb | 8 | 8 | 8 | 12 | 12 | 12 |
| Lime, ppb | 3.00 | 3.00 | 3.00 | 3 | 3.00 | 3.00 |
| RHEMOD ™ L, ppb | 3.00 | 3.00 | 3.00 | 3 | 3.00 | 3.00 |
| ADAPTA, ppb | 1.50 | 1.50 | 1.50 | 1.5 | 1.50 | 1.50 |
| PE-TS | — | 9 | 9 | — | 9 | 9 |
| CaCl$_2$ soln, ppb | 160.26 | 161.53 | 160.26 | 107.53 | 108.52 | 107.53 |
| TAU-MOD, ppb | 5 | — | 5 | 5 | — | 5 |
| Rev Dust, ppb | 20.00 | 20.00 | 20.00 | 20.00 | 20.00 | 20.00 |
| BAROID, ppb | 35.61 | 43.21 | 35.61 | 258.63 | 266.41 | 258.63 |
| BARACARB 5, ppb | 5 | — | 5 | 5 | — | 5 |

All of the samples of the above invert emulsion fluid formulations were hot rolled at 250° F. for 16 hours. The rheological properties of the resulting fluids are given below in Table 18.

TABLE 18

Rheological Properties of Invert Emulsion Fluids With A Polar Hydrophobe

| Formulation Containing PE-TS | 36 (Base Mud) | 37 | 38 | 39 | 40 | 41 |
|---|---|---|---|---|---|---|
| Fann 35 Readings | | | | | | |
| 600 rpm | 41 | 57 | 65 | 72 | 88 | 108 |
| 300 rpm | 25 | 38 | 45 | 43 | 59 | 73 |
| 200 rpm | 19 | 31 | 37 | 34 | 46 | 61 |
| 100 rpm | 13 | 23 | 27 | 23 | 34 | 45 |
| 6 rpm | 5 | 9 | 12 | 8 | 14 | 22 |
| 3 rpm | 4 | 8 | 10 | 7 | 13 | 20 |
| PV | 16 | 19 | 20 | 29 | 29 | 35 |
| YP | 9 | 19 | 25 | 14 | 30 | 38 |
| LSYP | 3 | 7 | 8 | 6 | 12 | 18 |
| GELS 10 sec | 5 | 8 | 10 | 9 | 12 | 21 |
| GELS 10 min | 7 | 9 | 12 | 14 | 16 | 28 |
| ES @ 120° F., mV | 130 | 118 | 144 | 247 | 279 | 305 |
| HTHP, ml/30 min (250° F.) | 2.4 | 1 | 0.4 | 1.4 | 1 | 1 |

Upon review of the above data, one of ordinary skill in the art should understand that the invert emulsion fluids formulated in accordance with the present invention demonstrate improved rheological properties even without an added viscosifier. The results demonstrate that the amount of polar hydrophobic additive added to the invert emulsion fluid of the present invention may be used as a primary viscosifier without the need for additional viscosifying agents being added to the formulation. In particular, the invert emulsion fluids formulated according to the present invention demonstrate improved suspension characteristics relative to a 9 ppg and 13 ppg fluid, respectively, containing a viscosifier without a polar hydrophobic additive of the present invention.

Example 9

The thermal stability limits of one embodiment of a polar hydrophobic additive were also investigated. In this example, three samples were hot rolled at 250° F., which showed that the fluids were stable. The sample containing the polar hydrophobic additive of the present invention maintained its rheological properties while the other fluids had changes in their properties.

The polar hydrophobic additives of the present invention may be useful for imparting temperature stability to invert emulsion fluids. In order to demonstrate the ability of the polar hydrophobic additives of the present invention to act as temperature stabilizers, three invert emulsion fluid formulations were prepared with varying formulations. All of the invert emulsion formulations had a density of about 9.0 pounds per gallon ("ppg") and an oil to water ratio ("OWR") of about 60:40. All formulations used a cyclic alkane as the base oil and were formulated as indicated below in Table 19.

TABLE 19

Formulations of Invert Emulsion Fluids for Temperature Stability

| Formulation | 42 | 43 | 44 |
|---|---|---|---|
| OWR | 60:40 | 60:40 | 60:40 |
| Escaid 110 (bbl) | 0.516 | 0.516 | 0.516 |
| ADAPTA (lb) | 1.5 | 1.5 | 1.5 |
| Lime (lb) | 3.0 | 3.0 | 3.0 |
| EZ MUL NT (lb) | 8.0 | 8.0 | 8.0 |
| $CaCl_2$ (lb) | 33.2 | 33.2 | 33.2 |
| BAROID (lb) | 28.4 | 28.4 | 28.4 |
| TAU-MOD (lb) | 5.0 | 5.0 | 5.0 |
| BARACARB 5 (lb) | 5.0 | 5.0 | 5.0 |
| RHEMOD ™ L (lb) | 3.0 | 3.0 | 3.0 |
| Rev Dust (lb) | 20.0 | — | — |
| Sodium bentonite clay (lb) | — | 20.0 | 20.0 |
| PE-TS (cc) | — | — | 9.0 |

A portion of samples 36, 37, and 38 were each hot rolled at 150° F. for 16 hours. After this time, the rheological properties were determined according to the ANSI/API RP 13B-2: Recommended Practice for Field Testing Oil-based Drilling Fluids test method. Another portion of each sample was hot rolled at 250° F. for 16 hours, after which the rheological properties were similarly determined. The results of these tests are shown in Table 20. As an additional measure of temperature stability, a portion of sample 38 was hot rolled at 250° F. for 16 hours followed by hot rolling at 350° F. for 6 hours. After this time, the rheological properties were determined. This sample showed signs of degradation of the polar hydrophobic additive component as indicated by a loss of the rheological benefits. The properties then matched sample 43, which was formulated the same but without added polar hydrophobic additive.

TABLE 20

Effects of A Polar Hydrophobic Additive on Temperature Stability of Invert Emulsion Fluids

| | Sample 42 Results | | Sample 43 Results | | Sample 44 Results | | |
|---|---|---|---|---|---|---|---|
| | 150° F. | 250° F. | 150° F. | 250° F. | 150° F. | 250° F. | 350° F. |
| Property | | | | | | | |
| PV @ 120 F. (centipoise) | 17 | 17 | 21 | 21 | 22 | 23 | 19 |
| Yield Point (lb/100 ft$^2$) | 4 | 2 | 14 | 9 | 28 | 28 | 11 |
| 10-sec gel (lb/100 ft$^2$) | 3 | 3 | 4 | 5 | 10 | 10 | 5 |
| 10-min gel (lb/100 ft$^2$) | 5 | 4 | 6 | 7 | 13 | 12 | 9 |
| LSYP | 1 | 1 | 3 | 3 | 8 | 9 | 3 |
| ES | 182 | 161 | 152 | 160 | 244 | 151 | 331 |

TABLE 20-continued

Effects of A Polar Hydrophobic Additive on Temperature Stability of Invert Emulsion Fluids

| | Sample 42 Results | | Sample 43 Results | | Sample 44 Results | | |
|---|---|---|---|---|---|---|---|
| | 150° F. | 250° F. | 150° F. | 250° F. | 150° F. | 250° F. | 350° F. |
| Fann 35 dial readings | | | | | | | |
| 600 rpm | 38 | 36 | 56 | 51 | 72 | 74 | 49 |
| 300 rpm | 21 | 19 | 35 | 30 | 50 | 51 | 30 |
| 200 rpm | 15 | 14 | 27 | 23 | 41 | 41 | 23 |
| 100 rpm | 10 | 9 | 18 | 15 | 30 | 30 | 15 |
| 6 rpm | 3 | 3 | 5 | 5 | 12 | 11 | 5 |
| 3 rpm | 2 | 2 | 4 | 4 | 10 | 10 | 4 |

Upon review of the above data one of ordinary skill in the art should appreciate that the above noted invert emulsion fluid (Sample 44) formulated in accordance with the present invention is stable and useful even after being hot rolled at 250° F. This is in contrast to Samples 42 and 43 which demonstrate lower initial rheological properties and marginal stability.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing an invert emulsion fluid comprising:
an oil-based continuous phase,
an aqueous discontinuous phase,
an emulsifier, and
a polar hydrophobic additive that comprises a polar hydrophobe, wherein the polar hydrophobe comprises a structure selected from the group consisting of:

and any combination thereof;
wherein $R^1$ and $R^2$ comprise at least partially hydrophobic groups; X comprises an ester group and a hydrophilic group selected from the group consisting of: a halogen, a haloformyl group, an aromatic group, a carbonate group, a hydroperoxy group, a peroxy group, a cyanate group, a nitrate group, a nitrile group, a sulfonyl group, a sulfonate group, a sulfate group, a combination thereof, and a derivative thereof; and C is a carbon atom,
wherein the polar hydrophobic additive comprises at least four X groups,
wherein the polar hydrophobic additive may substantially increase the yield point, the low-shear yield point, or both of the invert emulsion fluids relative to a fluid without a polar hydrophobic additive while limiting the change in the plastic viscosity to no more than about 35% of the change in the property, yield point or low-shear yield point, with the largest increase; and
placing the invert emulsion fluid in a subterranean formation.

2. The method of claim 1 wherein $R^2$ comprises four or more carbon atoms.

3. The method of claim 1 wherein the invert emulsion fluid has a solids content of less than about 600 pounds per barrel.

4. The method of claim 1 wherein the invert emulsion fluid comprises from about 0.25 to about 18 pounds per barrel of the polar hydrophobic additive.

5. The method of claim 1 wherein the oil-based continuous phase comprises at least one oil selected from the group consisting of: paraffin oil, a mineral oil, a synthetic oil, a diesel oil, a combination thereof, and a derivative thereof.

6. The method of claim 1 wherein the oil-based continuous phase comprises greater than about 30% by volume of the total fluid.

7. The method of claim 1 wherein the invert emulsion fluid comprises at least one additive selected from the group consisting of: a solid, a weighting agent, an inert solid, a fluid loss control agent, an emulsifier, a salt, a dispersion aid, a corrosion inhibitor, an emulsion thinner, an emulsion thickener, a viscosifier, a combination thereof, and a derivative thereof.

* * * * *